May 10, 1949.  G. A. SLOAN  2,469,794
BRAKE PRESSURE REGULATOR
Filed July 27, 1945
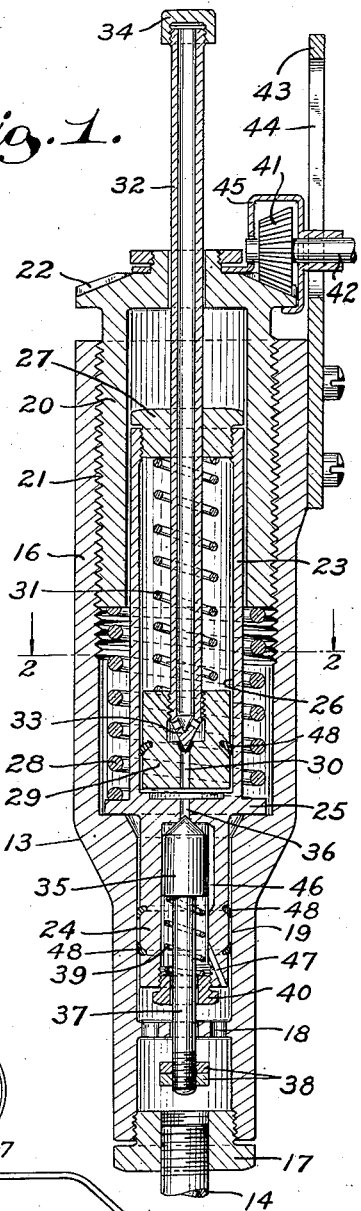
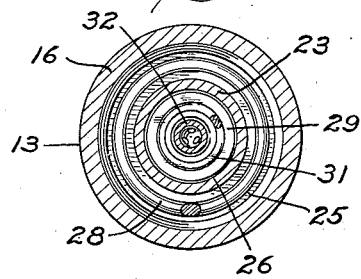
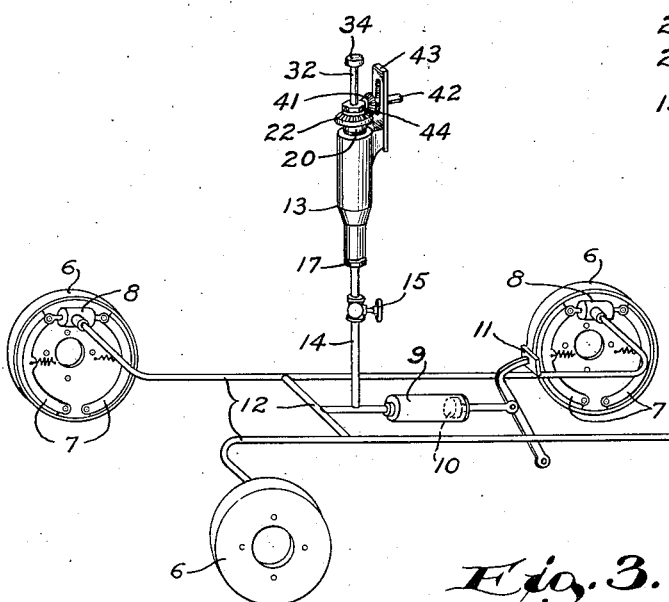
INVENTOR.
George A. Sloan
BY
Lieber & Lieber
ATTORNEYS.

Patented May 10, 1949

2,469,794

UNITED STATES PATENT OFFICE 2,469,794

BRAKE PRESSURE REGULATOR

George A. Sloan, Milwaukee, Wis.

Application July 27, 1945, Serial No. 607,354

12 Claims. (Cl. 138—31)

The present invention relates generally to improvements in hydraulic brake systems, and relates more specifically to improvements in the construction and operation of regulators for controlling the braking pressures in such systems under emergency conditions.

The primary object of my invention is to provide an improved regulating device for controlling the pressure in a hydraulic brake system so as to obtain maximum braking efficiency when making emergency stops, and to eliminate danger of locking the vehicle wheels.

Most of the modern automobiles are now provided with hydraulic brake systems wherein confined liquid is adapted to be subjected to pressure created by the operator so as to control the vehicle movement; and considerable difficulty has heretofore been encountered in preventing locking of the vehicle wheels and resultant uncontrollable motion or skidding of the vehicles especially when making emergency stops. Then too, when a vehicle equipped with hydraulic or fluid pressure actuated brakes is heavily laden, it obviously requires greater braking effort than when the same vehicle is carrying relatively light loads, and the same is true when travelling through hilly territory and along slippery roads. It is therefore exceedingly desirable to have available some simple and readily manipulable instrumentalities for varying the pressure in such hydraulic brake systems, to meet varying demands and operating conditions, and to provide sufficient braking pressure to insure stoppage of the vehicle in emergency cases without causing the wheels to lock and skid.

It is therefore a more specific object of this invention to provide an improved hydraulic brake pressure regulator which is adapted to effectively meet the above mentioned conditions and emergencies, and which will insure most efficient functioning of the brakes at all times.

Another specific object of the present invention is to provide an improved brake pressure regulating device which is simple and compact in construction and effective in use, and which may be readily applied to most hydraulic brake systems as an accessory and at moderate cost.

A further specific object of my invention is to provide an improved pressure regulator for hydraulic braking systems or the like, which may be readily adjusted to meet various conditions of operation, and which is conveniently manipulable for adjustment from the driver's seat of a vehicle.

Still another specific object of the invention is to provide an effective hydraulic brake pressure regulator which may be manufactured and sold at moderate cost, and which may be quickly manipulated to accurately predetermine the available pressure existing in the system necessary to insure emergency stoppage while eliminating danger of wheel locking and skidding.

These and other specific objects and advantages of my invention will be apparent from the following detailed description.

A clear conception of the features constituting my present improvement, and of the mode of constructing and utilizing brake pressure regulating devices embodying the invention, may be had by referring to the drawing accompanying and forming a part of this specification wherein like reference characters designate the same or similar parts in the various views.

Fig. 1 is a central vertical section through one of the improved hydraulic brake pressure regulating devices especially adapted for use in connection with hydraulic vehicle brake systems;

Fig. 2 is a transverse horizontal section through the device of Fig. 1, taken along the line 2—2; and Fig. 3 is a diagram of a typical vehicular hydraulic brake system, having my improved regulating device applied thereto.

While the invention has been shown and described herein as being especially and advantageously applicable to the hydraulic brake system of a four wheel vehicle, it is to be understood that it is not my desire or intent to unnecessarily limit the scope or restrict the utility by virtue of this specific embodiment.

Referring to the drawing, the typical hydraulic brake system shown diagrammatically in Fig. 3, comprises in general four similar brake drums 6 associated directly with the front and rear wheels of the vehicle; a set of brake shoes or elements 7 associated with each of the drums 6 and each set being operable by a small braking cylinder 8 to frictionally retard the rotation of the adjacent drum; a master brake cylinder 9 having therein a piston 10 operable by the vehicle driver through a foot pedal 11; a system of piping 12 connecting the displacement chamber of the master cylinder 9 with the four braking cylinders 8; and an improved brake pressure regulating device 13 located near the driver's seat and being connected to the piping 12 by a riser pipe 14 preferably having a shut-off valve 15 therein.

The improved hydraulic brake pressure regulator is shown enlarged and more in detail in Figs. 1 and 2, and consists primarily of a tubular upright body 16 having a closure cap 17 at its lower end to which the pipe 14 is attached, and being provided above the cap 17 with a transverse perforated partition 18 and with a central bore 19; a pressure adjusting sleeve or cup 20 having external screw threads 21 coacting with internal screw threads formed in the upper enlarged portion of the body 16, and also having a bevel gear 22 formed integral with its upper end; a hollow relief cylinder 23 movably confined within the body 16 and cup 20 and having its lower end formed as a plunger 24 slidably cooperable with the body bore 19 while its medial portion is provided with an integral flange 25 and its upper end is provided with a central bore 26 which is closed by a screw cap 27; a helical compression spring 28 surrounding the cylinder 23 within the body 16 and coacting with the flange 25 and with the lower end of the cup 20; a piston 29 slidably cooperable with the cylinder bore 26 and having a central port 30 therein; another helical compression spring 31 confined within the cylinder 23 and coacting with the cap 27 and piston 29; a bleeder tube 32 having a conical lower end 33 normally sealing the port 30, this tube 32 having screw thread coaction with the piston 29 and being provided at its upper end with a closure cap 34; a relief valve 35 slidably confined within the central bore of the cylinder plunger 24 and coacting with a passage 36 formed in the cylinder 23 between the bore 26 and the plunger 24, this valve 35 having a stem 37 provided with adjustable nuts 38 which are cooperable with the body partition 18 to open the valve and being normally closed by a spring 39 coacting with a cap 40 carried by the plunger 24; and a bevel pinion 41 carried by a manually rotatable shaft 42 coacting with a fixed guide 43 and meshing with the bevel gear 22 of the cup 20 for varying the tension of the spring 28.

The main casing or body 16 of the improved pressure regulator, may be fixedly mounted within the vehicle near the instrument panel, in any convenient manner; and the bracket or guide 43 is preferably secured to the body 16 and is provided with a guide slot 44 along which the pinion bearing housing 45 is movable. The guide bracket 43 may be calibrated to indicate the approximate pressure existing in the brake system and as predetermined by the setting of the cup 20; and it is to be noted that by rotating the pinion 41 with the aid of the shaft 42, the cup 20 may be raised or lowered to thereby vary the tension of the compression spring 28. This variation in spring tension will obviously vary the pressure in the system acting upon the lower end of the plunger 24 and which is required to lift the cylinder 23 whenever the vehicle brakes are applied by the operator in a manner whereby the pressure created in the piping 12 tends to exceed that established by the spring 28.

The cup 20 may either have the bevel gear 22 formed integral therewith or rigidly attached thereto, and the bleeder tube 32 which is carried by the piston 29 is freely slidable through a central opening in the gear 22. The relief cylinder 23 and the plunger 24 may either be formed integral or of separate pieces firmly united, and the bores 19, 26 of the body 16 and cylinder 23 are preferably of the same diameter in order to facilitate machining. The plunger 24 and piston 29 are provided with effective packing or sealing rings 48 as shown, in order to prevent undesirable leakage of liquid past these elements, and the bleeder tube 32 which normally seals the piston port 30 is also freely slidable through a central hole in the cap 27 and serves to release confined air from the brake system. The relief valve 35 which is slidable within the central bore of the plunger 24 and which normally seals the passage 36, has its stem 37 guided for movement in the body partition 18, and this valve 35 is movable with the plunger 24 and cylinder 23 until its motion is arrested by the nuts 38 carried by the stem 37 whereupon continued upward movement of the plunger 24 will cause the valve 35 to open and to compress the spring 39. The nuts 38 are adjustable along the stem 37 so as to effect opening of the valve 35 at the desired moment, and the plunger 24 is provided with liquid passages 46, 47 as shown in Fig. 1 for permitting liquid to flow therethrough past the valve 35.

During normal use of the improved pressure regulator, the assemblage 13 may be installed in connection with a hydraulic brake system in the manner shown in the diagram of Fig. 3, whereupon the shut-off valve 15 should be opened and the shaft 42 and pinion 41 should be manipulated so as to predetermine the compression of the main spring 28. As the shaft 42 and pinion 41 are rotated, rotation is imparted to the bevel gear 22 whereupon the cup 20 will be raised or lowered so as to effect the desired variation in spring tension. The degree of compression of the spring 28 may be readily determined by calibrations on the guide bracket 43, and the adjustment may be effected from the driver's seat. Assuming that the brake system has been properly filled with liquid, confined air should first be permitted to escape, and this may be accomplished by removing the cap 34 and rotating the bleeder tube 32 so as to open the port 30. Since the port 30 is located at the highest point of the system, confined air will collect beneath the piston 29, and this opening of the port 30 will permit the air to escape through the orifices in the tube point 33 and through the tube 32 in an obvious manner. After the air has been released, the tube 32 may again be rotated to seal the port 30, and the cap 34 may again be applied so as to prevent foreign matter from entering the tube 32.

When the desired adjustment of the cup 20 has been made as above indicated, the brakes may normally be applied without affecting the regulating device 13, by pressing the foot lever 11 forwardly and causing the piston 10 of the master cylinder 9 to move forwardly. The liquid in the system is then subjected to pressure and this pressure is transmitted through the piping 12 and acts upon the auxiliary brake cylinders 8 to apply the brake shoes 7 to the brake drums 6 in a well known manner. If a sudden increase in pressure caused by emergency stoppage of the vehicle, takes place, the plunger 24 will move upwardly due to excessive pressure introduced through the pipe 14, to such an extent that the nuts 38 coacting with the valve stem 37 will engage the transverse partition 18, thereby stopping the upward movement of the valve 35 and causing this valve to uncover the passage 36 and to compress the spring 39. Liquid under pressure will then pass through the ports 47, 46 of the plunger 24, and through the pipe 36 and will enter the bore 26 of the cylinder 23, thus causing the piston 29 to move upwardly against the spring 31 and permitting the excess pressure in the system to be relieved by flow of liquid into the displacement chamber of the cylinder 23. This release of excess pressure will cause the spring 28 to move the plunger 24 downwardly sufficient to permit the valve 35 to close and to maintain the pressure in the system at the predetermined maximum value.

When the pressure on the pedal 10 is subsequently released, the strong spring 28 will quickly become effective to move the cylinder 23 and plunger 24 downwardly until the flange 25 engages the casing 16. The pressure within the brake system aided by the spring 39 will maintain the valve 35 closed until the pressure in the system is subsequently further relieved, whereupon the lighter spring 30 will become effective to move the piston 29 downwardly and to return the escaped liquid to the system past the valve 35. Complete release of the pressure in the brake system will therefore automatically restore the regulator 13 to the position indicated in Fig. 1; and the pressure in the brake system available for emergency braking, may obviously be quickly varied by merely adjusting the tension of the main spring 28 with the aid of the shaft 42 and pinion 41.

From the foregoing detailed description it will be apparent that my present invention provides an improved regulating device 13 which besides being extremely simple and compact in construction, is also highly efficient in use and may be conveniently adjusted to accurately predetermine the pressure available in a hydraulic brake system during emergency operation. Such adjustment may obviously be readily effected from the driver's seat of the vehicle, and the regulating device 13 may be quickly installed in conjunction with standard hydraulic brake systems. The provision of a shut-off valve 15, will also permit installation or removal of the device without interferring with the operation of the brakes, and the threaded cup 20 and caps 17, 27, 40 permit rapid and convenient assembly or dismantling of the improved apparatus. By providing bores 19, 26 of like diameter, the plunger 24 and piston 29 may also be made of like diameter, thereby facilitating machining of the parts, and all of the working parts of the assemblage are normally concealed and protected against possible damage.

The bleeder tube 32 also provides means for conveniently releasing the air from the brake system, and the cylinder 23 may be made of sufficient length to provide considerable capacity for liquid released from the brake system after the predetermined maximum pressure has been established. When the device has been properly set, it functions to automatically predetermine the pressure available within the hydraulic brake system for emergency purposes, but the operator may quickly adjust this pressure to meet varying conditions of operation and loading of the vehicle. The improved regulating device 13 may obviously be manufactured at moderate cost and applied to various types of hydraulic systems without interferring with the normal operation of these systems.

It is a well known fact that locked wheels on a rubber tired vehicle result in loss of braking efficiency and tend to introduce skidding when emergency stops are made, and it is also a fact that the maximum braking effect is obtainable just prior to the time that the wheels tend to lock and skid. The improved regulating device 13 is therefore constructed and made adjustable for varying load and road surface conditions, that it will limit the available brake pressure under emergency operation and will maintain the most effective high braking pressure until the vehicle comes to a complete stop or until the foot pedal has been released, without introducing wheel locking and skidding. The single adjustment of one spring 28 makes this improved result possible, and the mechanism for effecting this adjustment will permit rapid and accurate predetermining of the pressure.

It should be understood that it is not desired to limit this invention to the exact details of construction or to the precise mode of operation, herein shown and described, for various modifications within the scope of the appended claims may occur to persons skilled in the art.

I claim:

1. A pressure regulator for hydraulic brake systems, comprising, a body having a bore, a cylinder having a hollow plunger slidably cooperable with said body bore and also having a bore and a passage connecting said cylinder bore with the interior of said plunger, a piston slidably cooperable with said cylinder bore, a valve for controlling the opening and closing of said passage, and a pair of springs coacting with said cylinder and piston respectively for constantly urging said plunger and said piston in the same direction.

2. A pressure regulator for hydraulic brake systems, comprising, a body having a bore, a cylinder having a hollow plunger slidably cooperable with said body bore and also having a bore and a passage connecting said cylinder bore with the interior of said plunger, a spring pressed piston slidably cooperable with said cylinder bore, and a valve carried by said plunger for controlling the opening and closing of said passage, said valve being movable to open position when said cylinder and plunger have reached a predetermined position.

3. A pressure regulator for hydraulic brake systems, comprising, a body having a bore, a cylinder having a hollow plunger slidably cooperable with said body bore and also having a bore and a passage connecting said cylinder bore with the interior of said plunger, a spring pressed piston slidably cooperable with said cylinder bore, and a valve carried by said plunger for controlling the opening and closing of said passage, said valve being movable into open position by said body whenever said plunger has been moved to a predetermined extent by the hydraulic pressure in the system.

4. A pressure regulator for hydraulic brake systems, comprising, a body having a bore, a cylinder having a hollow plunger slidably cooperable with said body bore and also having a bore and a passage connecting said cylinder bore with the interior of said plunger, a spring pressed piston slidably cooperable with said cylinder bore, a valve carried by said plunger for controlling the opening and closing of said passage, said valve being movable to open position when said cylinder and plunger have reached a predetermined position, and a spring for constantly urging said cylinder and plunger in one direction.

5. A pressure regulator for hydraulic brake systems, comprising, a body having a bore communicating with the hydraulic brake system, a cylinder having a bore disposed in axial alinement with said body bore and also having a hollow plunger slidably cooperable with the body bore and a passage adapted to connect the cylinder bore with the system, a valve for controlling the opening and closing of said passage, resilient means for constantly urging said cylinder and plunger toward the system, and means for effecting adjustment of said resilient means to cause said valve to open said passage when a predetermined pressure has been established within the system.

6. A pressure regulator for hydraulic brake systems, comprising, a body having a bore communicating with the hydraulic brake system, a cylinder having a bore disposed in axial alinement with said body bore and also having a hollow plunger slidably cooperable with the body bore and a passage adapted to connect the cylinder bore with the system, a valve for controlling the opening and closing of said passage, a helical compression spring confined within said body for constantly urging said cylinder and plunger toward the system, and means for effecting adjustment of said spring to cause said valve to open said passage when a predetermined pressure has been established within the system.

7. A pressure regulator for hydraulic brake systems, comprising, a body having a bore in open communication with the hydraulic brake system, a cylinder having a plunger slidably cooperable with said bore and a relief passage in said plunger, a valve normally movable with said plunger for closing and opening said passage, and means for automatically opening said valve when said plunger has been subjected to a predetermined pressure prevailing in the system.

8. A pressure regulator for hydraulic brake systems, comprising, a body having a bore in open communication with the hydraulic brake system, a cylinder having a plunger slidably cooperable with said bore and a relief passage in said plunger, a valve carried by and normally movable with said plunger for closing and opening said relief passage, and a stop on said body cooperable with said valve to open said passage when said plunger has travelled a predetermined distance along said bore under the influence of the hydraulic pressure in the system.

9. A pressure regulator for hydraulic brake systems, comprising, a body having a bore in open communication with the hydraulic brake system, a cylinder having a plunger slidably cooperable with said bore and a relief passage in said plunger, a valve carried by and normally movable with said plunger for closing and opening said relief passage, a stop on said body cooperable with said valve to open said passage when said plunger has travelled a predetermined distance along said bore under the influence of the hydraulic pressure in the system, and adjustable means for predetermining the force resisting the movement of said cylinder and plunger by said hydraulic pressure.

10. A pressure regulator for hydraulic brake systems, comprising, a body having a bore in open communication with the hydraulic brake system, a cylinder having a plunger slidably cooperable with said bore and a relief passage in said plunger, a valve normally movable with said plunger for closing and opening said passage, means for automatically opening said valve when said plunger has been subjected to a predetermined pressure prevailing in the system, means for effecting variation of said predetermined pressure, and bleeder means for effecting escape of confined air from the system through said passage.

11. A pressure regulator for hydraulic brake systems, comprising, a body having a bore in open communication with the hydraulic brake system, a cylinder having a plunger slidably cooperable with said bore and a relief passage in said plunger, a valve normally movable with said plunger for closing and opening said passage, means for automatically opening said valve when said plunger has been subjected to a predetermined pressure prevailing in the system, an adjustable spring coacting with said cylinder for effecting variation of said predetermined valve opening pressure, and a bleeder valve for effecting escape of confined air from the system through said passage.

12. A pressure regulator for hydraulic brake systems, comprising, a body having a bore in open communication with the hydraulic brake system, a cylinder having a plunger slidable along said bore and a relief passage in said plunger, an adjustable cup coacting with said body, a spring interposed between said cup and said cylinder, a piston slidable in said cylinder, a valve carried by said plunger and normally closing said passage, and means for opening said valve when said piston has travelled a predetermined distance to permit escape of liquid from the system to the interior of said cylinder.

GEORGE A. SLOAN.

REFERENCES CITED

The following references are of record in the file of this patent:

UNITED STATES PATENTS

| Number | Name | Date |
|---|---|---|
| 1,724,063 | Anderson | Aug. 13, 1929 |
| 2,166,384 | West | July 18, 1939 |
| 2,289,273 | Klaburner | July 7, 1942 |